(12) United States Patent
Yamamoto

(10) Patent No.: US 8,754,788 B2
(45) Date of Patent: Jun. 17, 2014

(54) COMMUNICATION DEVICE, COMMUNICATION METHOD, ROAD-TO-VEHICLE AND INTER-VEHICLE COMMUNICATIONS SYSTEM, PROGRAM AND RECORDING MEDIUM

(75) Inventor: Takeshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 738 days.

(21) Appl. No.: 12/920,763

(22) PCT Filed: Mar. 3, 2009

(86) PCT No.: PCT/JP2009/053959
§ 371 (c)(1),
(2), (4) Date: Sep. 2, 2010

(87) PCT Pub. No.: WO2009/110465
PCT Pub. Date: Sep. 11, 2009

(65) Prior Publication Data
US 2011/0012756 A1 Jan. 20, 2011

(30) Foreign Application Priority Data

Mar. 4, 2008 (JP) .................................. 2008-052947

(51) Int. Cl.
| | |
|---|---|
| G08G 1/09 | (2006.01) |
| G06F 19/00 | (2011.01) |
| G01C 21/12 | (2006.01) |
| H04M 1/00 | (2006.01) |
| H04B 1/38 | (2006.01) |
| H04J 3/00 | (2006.01) |

(52) U.S. Cl.
USPC ........... 340/991; 340/905; 340/992; 340/993; 340/995.15; 701/119; 701/465; 701/517; 701/513; 701/422; 455/513; 455/422.1; 455/457; 455/556.1; 455/557; 370/280; 370/342; 370/348; 370/350

(58) Field of Classification Search
USPC .............................. 340/995.13, 992, 991, 993
See application file for complete search history.

(56) References Cited

U.S. PATENT DOCUMENTS 6,292,725 B1 * 9/2001 Kageyama et al. ............. 701/23
6,335,693 B1 * 1/2002 Takahashi et al. ............ 340/905

(Continued)

FOREIGN PATENT DOCUMENTS

| JP | 2001148089 A | 5/2001 |
|---|---|---|
| JP | 2004-153759 A | 5/2004 |

(Continued)

OTHER PUBLICATIONS

International Search Report for PCT/JP2009/053959 mailed Apr. 14, 2009.

(Continued)

Primary Examiner — Fekadeselassie Girma

(57) ABSTRACT

Provided is a communication device mounted in a vehicle or disposed at the roadside, which can adaptively and efficiently manage positional information relating to directly communicable surrounding in-vehicle communication devices and surrounding roadside communication devices and can stably transmit information to a specified communication destination even when the positional relationship between vehicles frequently changes. The communication device is provided with a surrounding communication device information table for holding positional information relating to other communication devices received from the other communication devices and receipt times and a transmission destination determination unit for, when transmission destination position/area information indicating the position or area of a communication device that is a communication destination is accepted, determining a communication device with which communication is to be established on the basis of the transmission destination position/area information and the contents held in the surrounding communication device information table and making a transmission destination setting signal.

19 Claims, 2 Drawing Sheets

(56) References Cited

U.S. PATENT DOCUMENTS

| | | | |
|---|---|---|---|
| 6,720,920 B2 * | 4/2004 | Breed et al. | 342/386 |
| 7,606,185 B2 * | 10/2009 | Saito | 370/310 |
| 7,751,945 B2 * | 7/2010 | Obata | 701/1 |
| 2004/0236499 A1 * | 11/2004 | Watanabe | 701/200 |
| 2006/0248222 A1 * | 11/2006 | Saito | 709/238 |

FOREIGN PATENT DOCUMENTS

| | | | |
|---|---|---|---|
| JP | 2004282193 A | | 10/2004 |
| JP | 2005012522 A | | 1/2005 |
| JP | 2005236460 A | | 9/2005 |
| JP | 2006-31125 A | | 2/2006 |
| JP | 200642313 A | | 2/2006 |
| JP | 2006-72725 A | | 3/2006 |
| JP | 200660635 A | | 3/2006 |
| JP | 2006325126 A | | 11/2006 |
| JP | 2006352190 A | * | 12/2006 |
| JP | 2007079804 A | | 3/2007 |
| JP | 2007251387 A | | 9/2007 |
| JP | 2007306120 A | | 11/2007 |

OTHER PUBLICATIONS

The Extended European Search Report for EP09 716 689.6 dated on Dec. 21, 2012.

Japanese Office Action for JP2008-052947 mailed Apr. 17, 2012.

Japanese Office Action for JP Application No. 2012-136954 mailed on Apr. 2, 2013 with Partial English Translation.

* cited by examiner

Fig.3

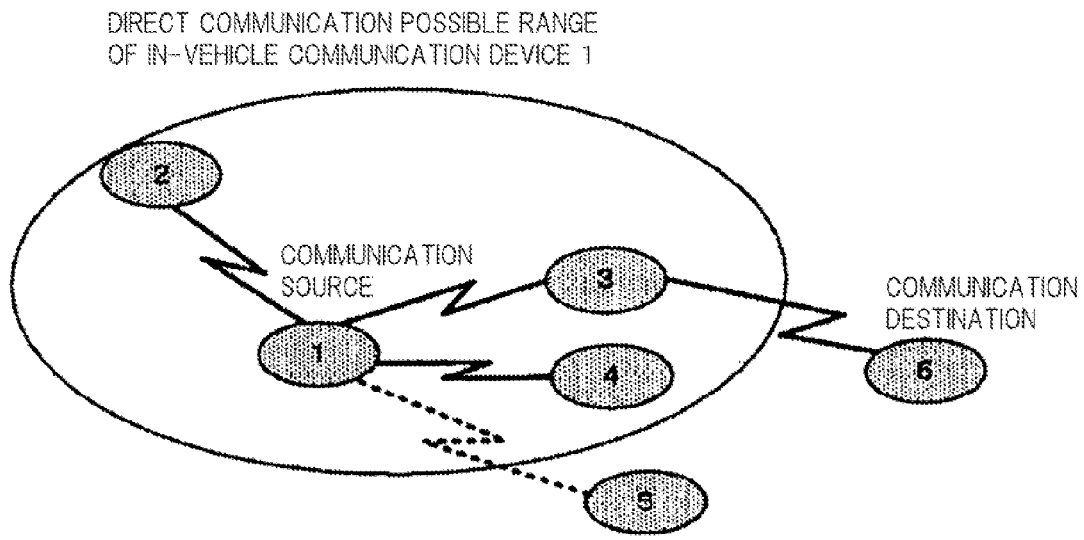

Fig.4

SURROUNDING COMMUNICATION DEVICE INFORMATION
TABLE 15 OF IN-VEHICLE COMMUNICATION DEVICE 1

| IN-VEHICLE COMMUNICATION DEVICE IN DIRECT COMMUNICATION POSSIBLE RANGE | POSITION INFORMATION | | POSITION INFORMATION RECEPTION TIME | |
|---|---|---|---|---|
| | PREVIOUS PERIOD | LATEST (PRESENT PERIOD) | PREVIOUS PERIOD | LATEST (PRESENT PERIOD) |
| 1 | Position 1-1 | Position1 (OWN IN-VEHICLE COMMUNICATION DEVICE) | T1-1 | T1-1 (OWN IN-VEHICLE COMMUNICATION DEVICE) |
| 2 | — | Position2 (EFFECTIVE POSITION INFORMATION) | — | T2 |
| 3 | Position 3-1 | Position3 (EFFECTIVE POSITION INFORMATION) | T3-1 | T3 |
| 4 | Position 4-1 | Position4 (EFFECTIVE POSITION INFORMATION) | T4-1 | T4 |
| 5 | Position 5-1 | (Position5) (INFORMATION OF EXPIRED EFFECTIVE PERIOD) | T5-1 | (T5) (EXPIRATION OF EFFECTIVE PERIOD) |

COMMUNICATION DEVICE, COMMUNICATION METHOD, ROAD-TO-VEHICLE AND INTER-VEHICLE COMMUNICATIONS SYSTEM, PROGRAM AND RECORDING MEDIUM

This application is the national Phase of PCT/JP2009/053959,filed Mar. 3, 2009,which claims the benefit of priority from Japanese Patent Application No. 2008-052947filed in Japan on Mar. 4,2008the entire content of which is hereby incorporated by reference in the application and claims of the present application.

TECHNICAL FIELD

The present invention relates to a communication device, a communication method, road-to-vehicle and inter-vehicle communication systems, a program, and a recording medium.

BACKGROUND ART

With the development of communication technologies in recent years, an inter-vehicle communication system which performs communication between moving vehicles by using in-vehicle communication devices mounted on the vehicles, and a road-to-vehicle communication system which performs communication between a vehicle and a roadside communication device installed at the roadside of a road, an interchange, or the like, have become widely used.

Patent Document 1 (JP2005-12522A) discloses an inter-vehicle communication method which aims at suppressing an increase in redundant traffic due to inter-vehicle communication, and at enabling a radio band to be effectively used in the vehicle communication.

Patent Document 1 discloses a method in which, when communication is performed by successively relaying transmission information between vehicles, a communication source determines, as a relay vehicle, a surrounding vehicle that is located on a branch road and that is located furthest from the vehicle of the communication source itself, on the basis of the position information of the surrounding vehicles and the map information.

Patent Document 1: JP2005-12522A (page 4 to 6)

DISCLOSURE OF THE INVENTION

Problems to be Solved by the Invention

The information transmission method as disclosed in Patent Document 1 is not suitable as an application for transmitting transmit necessary information to a designated communication destination in the road-to-vehicle and inter-vehicle communication systems.

Further, in the information transmission method, it is difficult to check whether or not the designated communication destination can directly communicate with the communication source in-vehicle communication device, and hence it is difficult to transmit information by efficiently using a radio band.

Generally, in the road-to-vehicle and inter-vehicle communication systems, when communication is to be performed with a vehicle that is present in the surrounding area of an intersection that is located in the direction in which vehicle is advancing, an in-vehicle communication device mounted to the other vehicle or a roadside communication device, which exists in the direction of the communication destination, is selected as a relay communication device.

In order to surely perform the above described operation, it is effective to use, as disclosed in Patent Document 1, the position information on a surrounding in-vehicle communication device or a surrounding roadside communication device which exists in the surrounding area in the possible range of direct communication of the communication source in-vehicle communication device.

However, the positional relationship of the communication source in-vehicle communication device with respect to the surrounding in-vehicle and roadside communication devices is changed according to the traveling states of the vehicles. For this reason, it is important that the position information on the surrounding in-vehicle and roadside communication devices, which can directly communicate with the communication source in-vehicle communication device, be adaptively managed according to the vehicle traveling states, and that, when the communication is to be actually performed, a most suitable communication partner at the time of communication be selected as a relay communication device (an in-vehicle or roadside communication device).

The present invention has been made in view of the above described circumstances. An object of the present invention is to provide a communication device, a communication method, road-to-vehicle and inter-vehicle communication systems, a program, and a recording medium, in which each in-vehicle or roadside communication device adaptively and efficiently manages the position information on surrounding in-vehicle and roadside communication devices that are able to directly communicate with the each in-vehicle or with each roadside communication device, and in which, even when the positional relationship between the vehicles is frequently changed, the information can be stably transmitted to a designated communication destination.

Means for Solving the Problems

To this end, a communication device, a communication method, road-to-vehicle and inter-vehicle communication systems, a program, and a recording medium, according to the present invention, adopt the following characteristic configurations.

A communication device according to the present invention, which is mounted on a vehicle or arranged at the roadside, and which performs inter-vehicle communication between in-vehicle communication devices mounted to vehicles or road-to-vehicle communication between an in-vehicle communication device and a roadside communication device arranged at the roadside, is characterized by including:

an in-vehicle radio section which performs radio communication with other communication device;

a surrounding communication device information table which stores another communication device position information received from the other communication device and the reception time of the position information;

a transmission destination determining section which controls the storage content of the surrounding communication device information table, and which, when receiving transmission destination position/area information representing a position or area of a transmission destination communication device, determines, on the basis of the transmission destination position/area information and of the storage content of the surrounding communication device information table, a communication device with which communication is to be performed, and then returns the determination result as a transmission destination setting signal; and an in-vehicle communication control section which transmits its own device position information at every predetermined period from the in-vehicle radio section, which, when receiving the position information from the other communication device, stores the received position information in the surrounding communication device information table via the transmission destination determining section together with the reception time of the position information, and which, when performing communication with a communication device whose position or area is designated, outputs the transmission destination position/area information to the transmission destination determining section, and performs, via the in-vehicle radio section, communication with the communication device designated by the subsequently transmitted transmission destination setting signal.

In the inter-vehicle communication system according to the present invention, communication is performed by using the communication devices respectively mounted on vehicles different from each other.

In the road-to-vehicle communication system according to the present invention, communication is performed by using the communication device mounted on a vehicle and the communication device arranged at the roadside.

A communication method according to the present invention, which is performed by a communication device mounted on a vehicle or a communication device arranged at the roadside, and which performs inter-vehicle communication between in-vehicle communication devices mounted on vehicles or road-to-vehicle communication between an in-vehicle communication device and a communication device arranged at the roadside, is characterized in that other communication device position information received from the other communication device and the reception time of the position information are stored in a surrounding communication device information table, in that, when receiving transmission destination position/area information representing a position or area of a transmission destination communication device, a transmission destination determining section determines, on the basis of the transmission destination position/area information and the storage content of the surrounding communication device information table, a communication device with which communication is to be performed, and returns the determination result as a transmission destination setting signal, and in that an in-vehicle communication control section transmits its own device position information at every predetermined period, and stores, when receiving the position information from the other communication device, the received position information in the surrounding communication device information table via the transmission destination determining section together with the reception time of the position information, while when performing communication with a communication device whose position or area is designated, the in-vehicle communication control section outputs the transmission destination position/area information to the transmission destination determining section, and performs communication with the communication device designated by the subsequently transmitted transmission destination setting signal.

A program according to the present invention is featured in that the above described communication method is implemented by a computer-executable program.

A recording medium according to the present invention is characterized in that the above described program is recorded in a computer-readable recording medium.

BRIEF DESCRIPTION OF THE DRAWINGS

FIG. 3 is an illustration showing an example of a possible range of direct communication of the in-vehicle communication device shown in FIG. 2; and FIG. 4 is a table showing an example of surrounding communication device information table 15 in which information about surrounding in-vehicle communication devices capable of directly communicating with the in-vehicle communication device shown in FIG. 2 is set and registered.

BEST MODE FOR CARRYING OUT THE INVENTION

Figure 1:
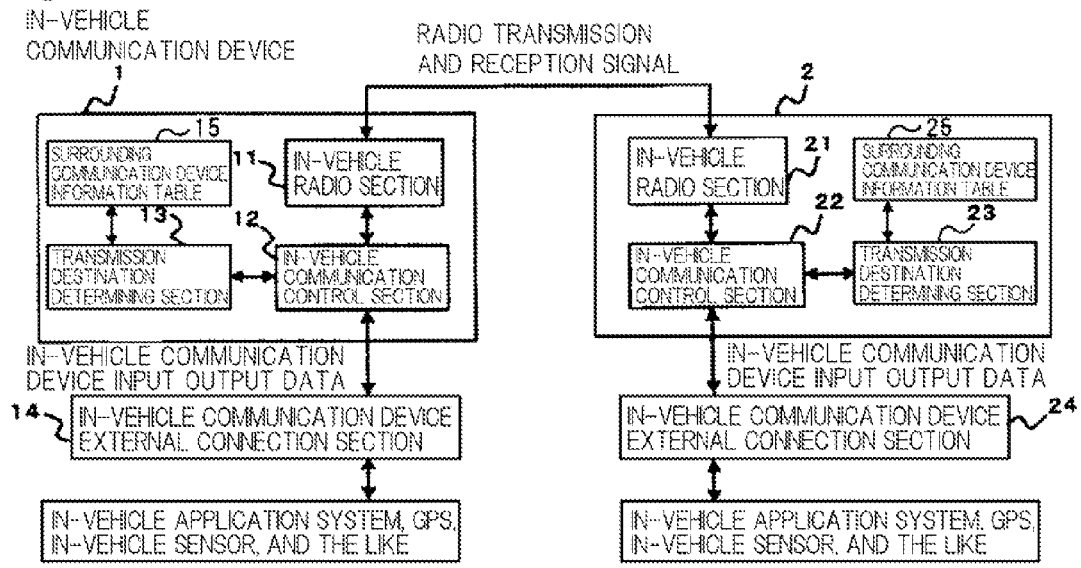
FIG. 1 shows an example of a system configuration of road-to-vehicle and inter-vehicle communication systems according to the present invention.

In the following, exemplary embodiments of road-to-vehicle and inter-vehicle communication systems, road-to-vehicle and inter-vehicle communication methods, road-to-vehicle and inter-vehicle communication programs, and a recording medium of the programs will be described with reference to the accompanying drawings.

Note that in the following description, an inter-vehicle communication system, and road-to-vehicle and inter-vehicle communication methods, according to the present invention, will be described, but the road-to-vehicle and inter-vehicle communication methods may be configured to be implemented as road-to-vehicle and inter-vehicle communication programs which can be executed by a computer. Further, it goes without saying that the road-to-vehicle and inter-vehicle communication programs may be configured to be recorded in a computer-readable recording medium.

(Features of the Invention)

Prior to the explanation of the exemplary embodiments according to the present invention, the outline of the features of the present invention will be described.

The present invention relates to a technique which enables information to be stably transmitted from a traveling vehicle under a continuously changing communication environment to a designated communication destination. In the present invention, when communication is to be performed with a vehicle existing at a position where radio waves do not directly reach, position information of the surrounding in-vehicle or roadside communication device which exist in a radio wave reachable range enables direct communication from a communication source in-vehicle or roadside communication device, and the reception time at the reception of the position information are efficiently managed and utilized as a determination material for selecting a relay in-vehicle or roadside communication device.

The present invention is characterized in that, even when the positional relationship between vehicles is frequently changed, information can be stably transmitted to the communication destination by preferentially utilizing the most lately received position information.

That is, in the road-to-vehicle and inter-vehicle communication systems according to the present invention, the position information of an in-vehicle communication device mounted on a traveling vehicle, and the position information of the other in-vehicle communication device and a roadside communication device which are capable of directly communicating with the in-vehicle communication device mounted on the traveling vehicle, are exchanged with each other at every predetermined period. Also, the in-vehicle communication device of each of the vehicles and the roadside communication device store, in the surrounding communication device information table, the received position information of the surrounding in-vehicle and roadside communication devices are stored together with the reception time at the reception of the position information.

According to the present invention, highly efficient and reliable road-to-vehicle and inter-vehicle communication is realized in such a manner that, when information is to be transmitted to a designated communication destination, whether or not the information can be transmitted to the designated communication destination is determined on the basis of the surrounding communication device information table, and that, when the information cannot be directly transmitted to the designated communication destination, and when a relay in-vehicle or roadside communication device for relaying communication to the communication destination is selected, the relay in-vehicle or roadside communication device is determined and selected by providing priority to the surrounding in-vehicle and roadside communication devices in consideration not only of the position information of the surrounding in-vehicle and roadside communication devices, but also of the reception time of the position information.

Further, in such cases where it is determined whether or not the direct communication can be performed with the communication destination and where a relay in-vehicle or roadside communication device is selected, the information, which is combined with the position information of the surrounding in-vehicle and roadside communication devices capable of directly communicating with the communication destination, is not limited only to the information of the reception time at the reception of the position information. The information about the advancing direction, the traveling speed, and the like, of the vehicle, to which each of the surrounding in-vehicle communication devices is mounted, may also be used as information which is combined with the position information. For example, the advancing direction and the traveling speed of a vehicle existing in the surrounding area in the possible range of communication may also be calculated in such a manner that, as the information stored in the surrounding communication device information table, the position information received before the latest reception time, for example, the position information received in a previous period, and the reception time of the position information may also be stored in the surrounding communication device information table besides the latest position information and the reception time of the position information.

In this way, the change in the relative positional relationship between the surrounding in-vehicle and roadside communication devices and the communication source in-vehicle or road side communication device can be estimated on the basis of the moving direction and the moving speed of the surrounding in-vehicle communication devices. Thus, the relay in-vehicle or roadside communication device can be more accurately selected, so that more efficient and highly reliable road-to-vehicle and inter-vehicle communication can be realized.

(Configuration Example of Exemplary Embodiment According to the Present Invention)

FIG. 1 is a block diagram showing a configuration of an exemplary embodiment of road-to-vehicle and inter-vehicle communication systems according to the present invention.

The exemplary embodiment shows a case where in-vehicle communication device 1 and in-vehicle communication device 2, which are respectively mounted on different vehicles existing in a reachable range of radio waves transmitted from the other of the vehicles, transmit information by performing direct communication using radio transmission and reception signals.

As shown in FIG. 1, in-vehicle communication device 1 includes in-vehicle radio section 11, in-vehicle communication control section 12, transmission destination determining section 13, and surrounding communication device information table 15, while in-vehicle communication device 2 includes in-vehicle radio section 21, in-vehicle communication control section 22, transmission destination determining section 23, and surrounding communication device information table 25.

Further, each of in-vehicle communication device 1 and in-vehicle communication device 2 is connected to each of in-vehicle communication device external connection sections 14 and 24 each of which is an interface device for connection with the in-vehicle system outside the in-vehicle communication device, and is connected to an in-vehicle application system, a GPS (Global Positioning System), an in-vehicle sensor, and the like, via each of in-vehicle communication device external connection sections 14 and 24.

As described above, in-vehicle communication device 1 and in-vehicle communication device 2 have the same configuration. Thus, in the following description, the operation of in-vehicle communication device 1 will be described, but the operation of in-vehicle communication device 2 having the same configuration is also the same.

In-vehicle radio section 11, which is a portion performing transmission and reception of radio signals by using a predetermined radio communication system and a radio communication channel, exchanges radio transmission and reception signals with the in-vehicle communication device mounted to the counterpart vehicle.

In-vehicle communication control section 12, which controls the operation of in-vehicle communication device 1, controls the data input/output operation from/to in-vehicle communication device external connection section 14, and the input/output operation of radio transmission and reception signals via in-vehicle radio section 11.

Further, in-vehicle communication control section 12 transmits the its vehicle position information, which is acquired, via in-vehicle communication device external connection section 14, from the GPS that is one of the in-vehicle systems outside the in-vehicle communication device, to each of the surrounding in-vehicle communication devices via in-vehicle radio section 11 at every predetermined period.

Further, when receiving, via in-vehicle radio section 11, the position information of the surrounding vehicles, which is periodically transmitted from the surrounding vehicles around the one's own vehicle, in-vehicle communication control section 12 outputs the received position information and the reception time at the reception of the position information to transmission destination determining section 13.

Further, when the information received from the in-vehicle system outside the in-vehicle communication device via in-vehicle communication device external connection section 14 is a communication request from an in-vehicle application system, which request includes information designating a communication destination, in-vehicle communication control section 12 outputs, to transmission destination determining section 13, a transmission destination acquisition request for requiring the designated communication destination in-vehicle or roadside communication device to acquire the geographical position information or the area information about the designated communication destination in-vehicle or roadside communication device.

Here, the geographical position information or the area information of the communication destination in-vehicle or roadside communication device is, for example, position information on a map, which relates to an intersection existing in the advancing (front) direction of the vehicle, or the area information on the map, which relates to a landmark existing at the side of the vehicle.

When in-vehicle communication control section 12 receives the surrounding vehicle position information which is periodically transmitted from each of the surrounding vehicles existing around the one's own vehicle, transmission destination determining section 13 stores the reception time of the surrounding vehicle position information in surrounding communication device information table 15 which sets and registers information (surrounding communication device information) about the surrounding in-vehicle and roadside communication devices.

When information is transmitted to the communication destination in-vehicle or roadside communication device, transmission destination determining section 13 determines whether or not the designated communication destination exists in the direct communication possible range, on the basis of the surrounding communication device information which is stored in surrounding communication device information table 15 and which relates to the surrounding in-vehicle and roadside communication devices.

Here, when determining that the designated communication destination exists in the impossible area of direct communication, transmission destination determining section 13 selects, as a transmission destination of the information to the communication destination, a relay surrounding in-vehicle or roadside communication device for relaying communication to the designated communication destination, on the basis of the geographical position information or the area information which is included in the transmission destination acquisition request and which relates to the communication destination in-vehicle or roadside communication device, and on the basis of the surrounding communication device information which is stored in surrounding communication device information table 15 and which relates to the surrounding in-vehicle and roadside communication devices, and then returns the selected transmission destination to in-vehicle communication control section 12.

On the other hand, as shown in FIG. 1, when in-vehicle communication device 1 and in-vehicle communication device 2 can directly communicate with each other, the communication destination of each of the in-vehicle communication devices is held in the surrounding communication device information which is stored in surrounding communication device information table 15 and which relates to the surrounding in-vehicle and roadside communication devices. Thus, transmission destination determining section 13 selects the communication destination as is as the transmission destination so as to allow the information to be directly transmitted to the communication destination, and then return the selected transmission destination to in-vehicle communication control section 12.

In-vehicle communication device external connection section 14 is an interface device to interface with the in-vehicle system outside the in-vehicle communication device, such as, as described above, the in-vehicle application system, the GPS, and the in-vehicle sensor, and receives input data from the in-vehicle system outside the in-vehicle communication device so as to output, as in-vehicle communication device input data, the received input data to in-vehicle communication device 1. Further, in-vehicle communication device external connection section 14 outputs, to the in-vehicle system outside the in-vehicle communication device, output data outputted as in-vehicle communication device output data from in-vehicle communication device 1.

(Description of Operation of Exemplary Embodiment)

Next, the operation of the exemplary embodiment will be described in detail with reference to FIG. 2.

Figure 2:
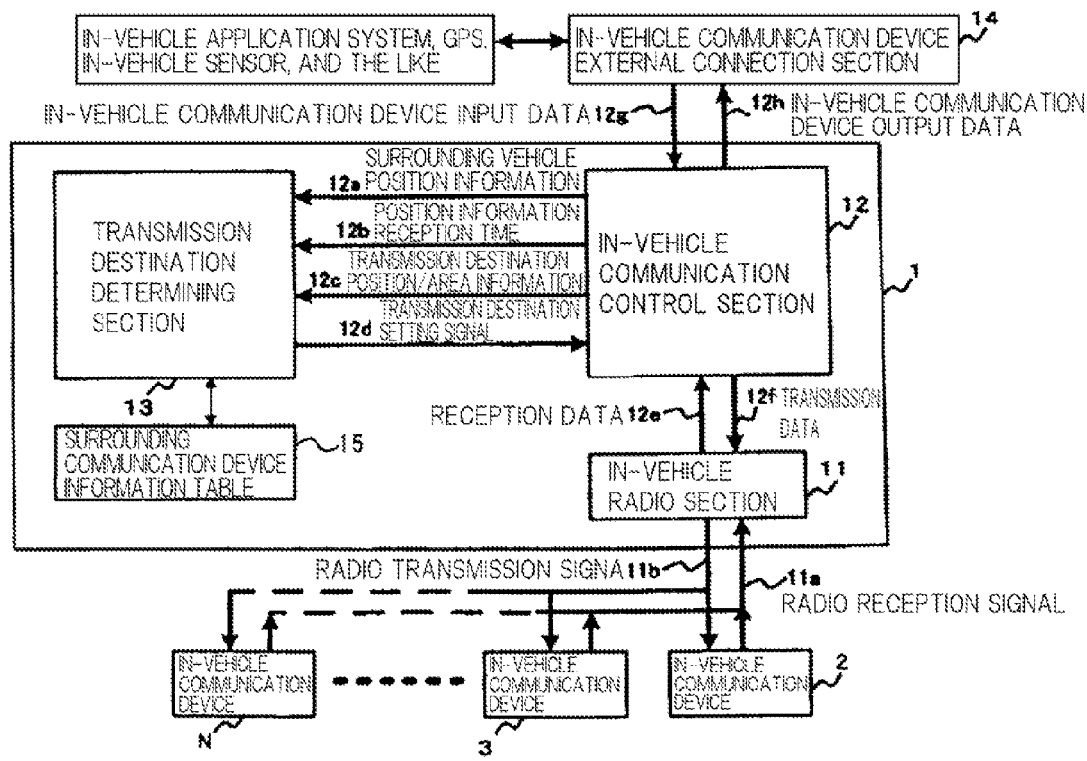
FIG. 2 is an illustration for explaining an example of an operation of the inter-vehicle communication system shown in FIG. 1.

FIG. 2 is an illustration for explaining an operation of the exemplary embodiment, and exemplifies an operation in the case where in-vehicle communication device 1 mounted to a certain vehicle performs transmission and reception of radio transmission and reception signals to and from in-vehicle communication devices 2, 3, . . . , N that are respectively mounted to the other (N−1) vehicles existing around the vehicle to which in-vehicle communication device 1 is mounted.

In FIG. 2, in-vehicle communication device 1 receives in-vehicle communication device input data 12g from an external in-vehicle system, such as an in-vehicle application system, via in-vehicle communication device external connection section 14.

Further, in-vehicle communication device 1 outputs in-vehicle communication device output data 12h to an external in-vehicle system via in-vehicle communication device external connection section 14.

Further, in-vehicle communication device 1 transmits radio transmission signal 11b to in-vehicle communication devices 2, 3, . . . , N that are respectively mounted to the (N−1) surrounding vehicles existing around the vehicle to which in-vehicle communication device 1 is mounted. On the contrary, in-vehicle communication device 1 receives radio reception signal 11a from in-vehicle communication devices 2, 3, . . . , N that are respectively mounted to the (N−1) surrounding vehicles existing around the vehicle to which in-vehicle communication device 1 is mounted.

In-vehicle radio section 11 included in in-vehicle communication device 1 receives radio reception signal 11a from an in-vehicle communication device among in-vehicle communication devices 2, 3, . . . , N that are respectively mounted to the (N−1) surrounding vehicles existing around the vehicle to which in-vehicle communication device 1 is mounted, and outputs, as reception data 12e, the received data to in-vehicle communication control section 12.

In-vehicle communication control section 12 outputs, as in-vehicle communication device output data 12h, reception data 12e received from in-vehicle radio section 11, to in-vehicle communication device external connection section 14, and in-vehicle communication device external connection section 14 outputs in-vehicle communication device output data 12h to an external in-vehicle system.

When reception data 12e, which is received as radio reception signal 11a and which is outputted via in-vehicle radio section 11, is the position information which is periodically transmitted at every predetermined period from each of in-vehicle communication devices 2, 3, . . . , N of the surrounding vehicles and which represents the present position of each of the surrounding vehicles, in-vehicle communication control section 12 outputs, as surrounding vehicle position information 12a and position information reception time 12b, each item of received position information and the reception time at the reception of the each position information to transmission destination determining section 13.

Transmission destination determining section 13, which has received surrounding vehicle position information 12a and position information reception time 12b, stores the received position information and position information reception time in surrounding communication device information table 15.

Note that, although not shown in FIG. 2, in the system in which the road-to-vehicle communication system and the inter-vehicle communication system are commonly used, when roadside communication device position information is periodically received from a roadside communication device installed at the side of a road, the received position information is similarly set and registered, as the position information of the roadside communication device communicable at that time, in surrounding communication device information table 15 together with the reception time at the reception of the position information.

Further, when in-vehicle communication control section 12 receives, from an in-vehicle system outside in-vehicle communication device 1 via in-vehicle communication device external connection section 14, in-vehicle communication device input data 12g to be transmitted to an in-vehicle communication device, for example, in-vehicle communication device N, among in-vehicle communication devices 2, 3, ..., N that are respectively mounted to the (N−1) surrounding vehicles existing around the vehicle to which in-vehicle communication device 1 is mounted, in-vehicle communication control section 12 performs the following operations.

In-vehicle communication control section 12 outputs, as transmission destination position/area information 12c, geographical position or area information about in-vehicle communication device N that is the communication destination designated by the in-vehicle system, (for example, the geographical position information of an intersection at the time when in-vehicle communication device N is an in-vehicle communication device existing near the intersection in the vehicle advancing direction) to transmission destination determining section 13. This is performed in order to acquire the information of the transmission destination at the time when radio transmission signal 11b is transmitted to communication destination in-vehicle communication device N.

Transmission destination determining section 13, which has received transmission destination position/area information 12c from in-vehicle communication control section 12, determines whether or not communication destination in-vehicle communication device N is a currently communicable in-vehicle communication device, by referring to surrounding communication device information table 15 and on the basis of the periodically updated and stored position information of each of the in-vehicle communication devices and the reception time at the reception of the position information.

When communication destination in-vehicle communication device N is registered in surrounding communication device information table 15 in a time period between the present time and the time going back by a predetermined time limit from the present time, transmission destination determining section 13 determines that information can be directly transmitted, as radio transmission signal 11b, to communication destination in-vehicle communication device N, and selects communication destination in-vehicle communication device N as the transmission destination of radio transmission signal 11b, so as to output, as transmission destination setting signal 12d, the information about selected communication destination in-vehicle communication device N, to request source in-vehicle communication control section 12.

On the other hand, when communication destination in-vehicle communication device N is not registered in surrounding communication device information table 15, or when, even though communication destination in-vehicle communication device N is registered in surrounding communication device information table 15, the reception time of the position information about communication destination in-vehicle communication device N is prior information which corresponds to a further previous time to the time going back by the predetermined time limit from the present time, transmission destination determining section 13 determines that the information cannot be directly transmitted, as radio transmission signal 11b, to communication destination in-vehicle communication device N, and selects, as a transmission destination of radio transmission signal 11b, the other in-vehicle communication device (or a roadside communication device) which relays the information to communication destination in-vehicle communication device N.

As a result, transmission destination determining section 13 outputs, as transmission destination setting signal 12d, information about the other in-vehicle communication device (or the roadside communication device), which is selected as a communication device for relaying the information to communication destination in-vehicle communication device N, to request source in-vehicle communication control section 12.

Here, when selecting the other in-vehicle communication device (or a roadside communication device) as a relay communication device, transmission destination determining section 13 refers to the position information and the reception time at the reception of the position information about the in-vehicle communication devices which are stored, as the in-vehicle communication devices capable of directly communicating with communication source in-vehicle communication device 1, in surrounding communication device information table 15, and also refers to the geographical position or area information about communication destination in-vehicle communication device N, which information is inputted, as transmission destination position/area information 12c, from in-vehicle communication control section 12.

On the basis of the reference results, from the in-vehicle communication devices which are set in surrounding communication device information table 15 and which are estimated to be able to perform direct communication, transmission destination determining section 13 extracts, as the other in-vehicle or roadside communication device for relaying the information to communication destination in-vehicle communication device N, an in-vehicle or roadside communication device which exists in the same direction as the advancing direction of communication destination in-vehicle communication device N, and the reception time of the latest position information, and selects the extracted in-vehicle or roadside communication device as the transmission destination of radio transmission signal 11b.

When receiving, as transmission destination setting signal 12d from transmission destination determining section 13, the information representing the transmission destination at the time when the information to in-vehicle communication device N is transmitted as radio transmission signal 11b, in-vehicle communication control section 12 edits the transmission data through which the information to in-vehicle communication device N is transmitted to the received transmission destination, and outputs, as transmission data 12f, the edited transmission data to in-vehicle radio section 11.

In-vehicle radio section 11, which has received transmission data 12f from in-vehicle communication control section 12, converts transmission data 12f into a radio signal to be transmitted to the in-vehicle or roadside communication device which serves as a communication destination or relay communication device and which is designated as the transmission destination of the information to in-vehicle communication device N, and transmits the converted radio signal as radio transmission signal 11b.

Note that, as described above, in-vehicle communication control section 12 receives, as in-vehicle communication input data 12g, the position information of one's own vehicle, to which in-vehicle communication device 1 provided with in-vehicle communication control section 12 is mounted, from the GPS as one of the in-vehicle systems outside in-vehicle communication device 1 via in-vehicle communication device external connection section 14 periodically at every predetermined period, and periodically outputs, as transmission data 12f, the received position information of one's own vehicle to in-vehicle radio section 11.

In-vehicle radio section 11, which has received, as transmission data 12f, the position information of one's own vehicle, that is, the position information of one's in-vehicle communication device 1 from in-vehicle communication control section 12, converts the position information of one's own vehicle, that is, the position information of one's own in-vehicle communication device 1 into a radio signal to be broadcasted to in-vehicle communication devices 2, 3, . . . , N that are respectively mounted to the (N−1) surrounding vehicles existing around the vehicle to which in-vehicle communication device 1 is mounted, and broadcasts, as radio transmission signal 11b, the converted radio signal to in-vehicle communication devices 2, 3, . . . , N.

Transmission of the position information of in-vehicle communication devices 2, 3, . . . , N that are respectively mounted to the other (N−1) vehicles is similarly performed, that is, the position information of each of the (N−1) vehicles, that is, the position information of each of in-vehicle communication devices 2, 3, . . . , N is periodically broadcasted.

As described above, when information is to be transmitted to a communication destination by using the road-to-vehicle and inter-vehicle communication systems, the transmission operation is performed in such a manner that the transmission destination of radio transmission signal 11b is acquired by transmission destination determining section 13, and such that radio transmission signal 11b is then transmitted to the acquired transmission destination. However, when the position information of one's own vehicle, that is, the position information of one's own in-vehicle communication device 1 itself is transmitted as radio transmission signal 11b, radio transmission signal 11b is broadcasted to the in-vehicle communication devices existing around one's own vehicle without via transmission destination determining section 13.

Next, an example of the operation, which is performed by transmission destination determining section 13 to determine the transmission destination of radio transmission signal 11b, will be described in detail with reference to FIG. 3 and FIG. 4.

FIG. 3 shows an example of possible range of direct communication possible range of in-vehicle communication device 1 shown in FIG. 2.

Three in-vehicle communication devices 2, 3 and 4 exist in a range in which they can directly communicate with in-vehicle communication device 1, that is, exist in the radio wave reachable range of in-vehicle communication device 1. In the example shown in FIG. 3, in-vehicle communication device 5 and the other subsequently numbered in-vehicle communication devices exist in the range in which they cannot directly communicate with in-vehicle communication device 1.

Further, FIG. 4 shows a setting example of surrounding communication device information table 15 in which information about the surrounding in-vehicle communication devices capable of directly communicating with in-vehicle communication device 1 is set and registered as the surrounding in-vehicle communication device information. FIG. 4 shows an example in the case where the respective in-vehicle communication devices are located in the positional relationship as shown in FIG. 3.

Note that it may also be configured such that, when in-vehicle communication device 1 is to transmit information to one of the in-vehicle and roadside communication devices, and when transmission destination determining section 13 receives the transmission destination acquisition request from in-vehicle communication control section 12, a table as shown in FIG. 4 is newly created by extracting only the information about the in-vehicle communication devices, which are estimated to relate to the in-vehicle or roadside communication device designated as the communication destination at this time (in-vehicle communication device 6 designated as the communication destination in the example shown in FIG. 3), from surrounding communication device information table 15 in which the other in-vehicle communication devices (and the roadside communication devices) capable of directly communicating with in-vehicle communication device 1 are periodically updated among the in-vehicle communication devices 2, 3, . . . , N respectively mounted to the (N−1) surrounding vehicles existing around the vehicle to which in-vehicle communication device 1 is mounted.

The example shown in FIG. 4 shows, as latest position information 13a (present position information), the case where the surrounding in-vehicle communication devices capable of directly communicating with communication source in-vehicle communication device 1 are three in-vehicle communication devices 2, 3 and 4, as shown in FIG. 3.

That is, FIG. 4 shows the in-vehicle communication devices (surrounding in-vehicle communication devices) mounted to the surrounding vehicles existing at positions in the possible direct communication range of in-vehicle communication device 1 mounted to its own vehicle which exists at Position 1 represented by latest position information 13a, at time T1 represented by latest position information reception time 13b.

In the example shown in FIG. 4, in-vehicle communication devices 2, 3 and 4, which respectively exist at Positions 2, 3 and 4 respectively represented by latest position information 13a, at times T2, T3 and T4 respectively represented by latest position information reception time 13b, are assumed as in-vehicle communication devices existing at positions in the direct communication possible range of in-vehicle communication device 1.

Note that as represented by latest position information reception time 13b, in-vehicle communication device 5 existed at latest time T5 at Position 5 in the possible direct communication possible range of in-vehicle communication device 1, but time T5 is more previous than the time going back by the predetermined time limit from the present time and hence exceeds the effective period. For this reason, the possibility that the vehicle, to which in-vehicle communication device 5 is mounted, has moved to the outside of the direct communication possible range of in-vehicle communication device 1 as shown in FIG. 3, and has moved to the outside of the radio wave reachable range of in-vehicle communication device 1, is estimated to be high at present, and hence, a display to indicate the expiration of the effective period is set as shown in FIG. 4.

That is, the predetermined time limit has elapsed from time T5 when the position of Position 5 was last received as the position information of in-vehicle communication device 5, and hence the effective period of T5 is set as expired. For this reason, as described above, the possibility that in-vehicle communication device 5, from which the position information is not received for a while after time T5, has moved to the outside of the possible range of direct communication of in-vehicle communication device 1 as shown in FIG. 3, is estimated to be high.

Further, in addition to latest position information 13a and latest position information reception time 13b representing the time at the reception of latest position information 13a, previous position information 13c received in a previous period, and previous position information reception time 13d at the reception of the previous position information 13c are also set in surrounding communication device information table 15 shown in FIG. 4. Thereby, the traveling speed and the advancing direction of the vehicle, to which each of the in-vehicle communication devices is mounted, can be grasped from the difference between latest position information 13a and previous position information 13c, and from the difference between latest position information reception time 13b and previous position information reception time 13d.

Therefore, it is possible to determine whether or not each of the surrounding in-vehicle communication devices shown in FIG. 4 is mounted on a vehicle traveling in the same advancing direction as the advancing direction of the vehicle to which communication source in-vehicle communication device 1 is mounted, and further, it is possible to determine whether or not each of the surrounding in-vehicle communication devices is mounted on the vehicle traveling at a small relative speed with respect to the vehicle to which communication source in-vehicle communication device 1 is mounted. On the basis of the determined results, it is possible to determine whether or not the in-vehicle communication device, which is capable of directly communicating with in-vehicle communication device 1 at present, continues to be capable of directly communicating with in-vehicle communication device 1.

However, as in the case of in-vehicle communication device 2 shown in FIG. 4, there may also be a case of an in-vehicle communication device which is represented by latest position information 13a as existing in the possible range of direct communication of in-vehicle communication device 1, but which did not exist in the possible range of direct communication of in-vehicle communication device 1 until the previous period as represented by previous position information 13c. In this case, it is not possible, at present, to grasp the traveling speed and the advancing direction of the vehicle to which in-vehicle communication device 2 is mounted. Thus, the traveling speed and the advancing direction of the vehicle, to which in-vehicle communication device 2 is mounted, are grasped by acquiring the position information from in-vehicle communication device 2 in the next period.

Here, as shown in FIG. 3, when inter-vehicle communication is to be performed so as to transmit information from communication source in-vehicle communication device 1 to communication destination in-vehicle communication device 6, and when the acquisition request of the transmission destination of radio transmission signal 11b for transmitting information to communication destination in-vehicle communication device 6 is transmitted from in-vehicle communication control section 12 to transmission destination determining section 13, transmission destination determining section 13 recognizes that relay transmission using the other in-vehicle communication device (or a roadside communication device) as a relay device needs to be performed, because in-vehicle communication device 6 does not exist in the possible range of direct communication of in-vehicle communication device 1 in surrounding communication device information table 15 which is created as an example and shown in FIG. 4.

Therefore, by referring to surrounding communication device information table 15 shown in FIG. 4, and the geographical position information or area information about communication destination in-vehicle communication device 6, which information is inputted as transmission destination position/area information 12c from in-vehicle communication control section 12, transmission destination determining section 13 determines which of in-vehicle communication devices 2, 3 and 4, existing in the possible range of direct communication of communication source in-vehicle communication device 1, is to be selected as a candidate relay device.

First, in surrounding communication device information table 15 shown in FIG. 4, in-vehicle communication device 2 existing at Position 2 is located in the direction opposite to the geographical position of communication destination in-vehicle communication device 6, and hence in-vehicle communication device 2 is excluded from the candidate relay device for relay transmission to in-vehicle communication device 6, or the priority of in-vehicle communication device 2, as the candidate relay device, is lowered.

Note that in-vehicle communication device 5 set in surrounding communication device information table 15 is also excluded from the candidate relay device for relay transmission to in-vehicle communication device 6 because the effective period of time T5 as position information reception time 13b has already expired as described above. However, the priority of in-vehicle communication device 5, as the candidate relay device for relay transmission to in-vehicle communication device 6, may also be lowered.

Therefore, one from among in-vehicle communication device 3 and in-vehicle communication device 4 is set as the candidate relay device for communication with communication destination in-vehicle communication device 6. Here, with reference to position information reception time 13b in surrounding in-vehicle communication device information table shown in FIG. 4, time T3 at the reception of the latest position information of Position 3 of in-vehicle communication device 3 is compared with time T4 at the reception of the latest position information of Position 4 of in-vehicle communication device 4. As a result of the comparison, for example, when time T3 is closer to the present time than time T4, it is determined that in-vehicle communication device 3 is more likely to be able to relay communication to in-vehicle communication device 6 than in-vehicle communication device 4, and in-vehicle communication device 3 is determined as the relay device.

Thereafter, transmission destination setting signal 12d, in which in-vehicle communication device 3 determined as the relay device is set as the transmission destination of radio transmission signal 11b, is outputted to request source in-vehicle communication control section 12.

Note that as described above, it may also be configured such that, when it is determined which from among in-vehicle communication device 3 and in-vehicle communication device 4 is selected as the relay in-vehicle communication device to communication destination in-vehicle communication device 6, the moving direction and speed of in-vehicle communication devices 3 and 4 are further respectively compared with the moving direction and speed of communication source in-vehicle communication device 1, to thereby determine which from among in-vehicle communication devices 3 and 4 is more likely to continue to maintain, even at present, the state that enables direct communication with communication source in-vehicle communication device 1, and such that the relay in-vehicle communication device is comprehensively determined also in consideration of the comparison result.

For example, in the case where in-vehicle communication device 3 is moving in the same direction as the moving direction of communication source in-vehicle communication device 1, and where the moving speed difference between in-vehicle communication device 3 and communication source in-vehicle communication device 1 is smaller than the moving speed difference between in-vehicle communication device 4 and communication source in-vehicle communication device 1, in-vehicle communication device 3 whose latest position information of Position 3 is received at latest time T3 is selected, as is, as the in-vehicle communication device for relaying information to communication source in-vehicle communication device 6.

However, it may also be configured such that in the case where the moving direction of in-vehicle communication device 3 is opposite to the moving direction of communication source in-vehicle communication device 1, or in the case where, even when the moving direction of in-vehicle communication device 3 is the same as the moving direction of communication source in-vehicle communication device 1, the moving speed difference between in-vehicle communication device 3 and communication source in-vehicle communication device 1 exceeds a predetermined threshold value and is larger than the moving speed difference between in-vehicle communication device 4 and communication source in-vehicle communication device 1, even if time T3 is closer to the present time than time T4, it is determined that in-vehicle communication device 4 is more likely to be able to relay communication to in-vehicle communication device 6, and such that in-vehicle communication device 4 is determined as the relay device in place of in-vehicle communication device 3 whose latest position information of Position 3 is received at latest time T3.

When receiving transmission setting signal 12*d* which is outputted from transmission destination determining section 13 and which represents the transmission destination of radio transmission signal 11*b* as, for example, relay in-vehicle communication device 3, in-vehicle communication control section 12 edits the information to in-vehicle communication device 6 into transmission data 12*f* whose transmission destination is set as relay in-vehicle communication device 3, and outputs the edited transmission data to in-vehicle radio section 11.

In-vehicle radio section 11, which has received transmission data 12*f* from in-vehicle communication control section 12, converts, into a radio signal, transmission data 12*f* in which the information to in-vehicle communication device 6 is edited into the information with relay in-vehicle communication device 3 as the transmission destination, and transmits the converted radio signal as radio transmission signal 11*b*.

Relay in-vehicle communication device 3, which has received radio transmission signal 11*b* from in-vehicle communication device 1, recognizes that the received radio reception signal is the relay information to in-vehicle communication device 6, and transfers the received radio reception signal to in-vehicle communication device 6.

Note that in the case where, in in-vehicle communication device information table 15 of in-vehicle communication device 1 shown in FIG. 4, the possibility that in-vehicle communication device 5 has moved to the outside of the possible range of direct communication of in-vehicle communication device 1 is estimated to be high at present, transmission destination determining section 13 can also leave in-vehicle communication device 5 as the candidate relay device for performing direct communication by lowering, as described above, the priority of in-vehicle communication device 5 to be selected as the candidate relay device. For relaying the information to communication destination in-vehicle communication device 6, an operation to select the other in-vehicle communication devices other than in-vehicle communication device 5 is first performed.

However, for example, as in the case of the example shown in FIG. 4, it may also be configured such that, in the case where both in-vehicle communication device 3 set as the candidate for relaying the information to in-vehicle communication device 6, and in-vehicle communication device 4 are moving in the direction opposite to the moving direction of communication source in-vehicle communication device 1, and where the positional relationship of in-vehicle communication devices 3 and 4 with respect to in-vehicle communication device 1 is likely to be reverse to the positional relationship of communication destination in-vehicle communication device 6 with respect to in-vehicle communication device 1, in-vehicle communication device 5, which is highly likely to exist in the same direction as the communication destination in-vehicle communication device 6, is selected as the relay device, and such that radio transmission signal 11*b* is attempted to be transmitted to in-vehicle communication device 5. It may also be configured such that, in the case where the receipt of confirmation from in-vehicle communication device 5 is not obtained in this attempt, an in-vehicle communication device, which is even positioned in the direction opposite to communication destination in-vehicle communication device 6 but which can directly communicate with in-vehicle communication device 1, for example, one from among in-vehicle communication devices 2, 3 and 4, is again selected as the relay device.

With the configuration and operations as described above in detail, when it is determined that in the inter-vehicle communication system, the direct communication cannot be performed with communication destination in-vehicle communication device, an in-vehicle communication device, which is highly likely to be able to directly communicate with the communication destination in-vehicle communication device, can be selected as the in-vehicle communication device for relaying communication to the communication destination in-vehicle communication device, from the other in-vehicle communication devices existing around the communication source in-vehicle communication device. Thereby, the information can be surely and efficiently transmitted to the communication destination in-vehicle communication device via the relay in-vehicle communication device.

Other Exemplary Embodiments of the Present Invention

In the above described exemplary embodiment, the inter-vehicle communication system is mainly described. However, the configuration in the case of the road-to-vehicle communication system, in which transmission and reception of information are performed between an in-vehicle communication device and a roadside communication device, is completely the same as the configuration in the case of the inter-vehicle communication system. Further, in the configuration of the road-to-vehicle and inter-vehicle communication system in which the road-to-vehicle communication and the inter-vehicle communication are commonly used, the system can be operated in completely the same manner as the inter-vehicle communication system when a part of the plurality of in-vehicle communication devices is read as the roadside communication devices.

That is, also in the case where the communication source in-vehicle or roadside communication device is to transmit information to a communication destination roadside or in-vehicle communication device existing in an area in which the communication source roadside or in-vehicle communication device cannot directly communicate with the communication destination in-vehicle or roadside communication device, information can be surely and efficiently transmitted to the communication destination roadside or in-vehicle communication device by performing, in completely the same manner as in the case of the above described inter-vehicle communication system, the operation to select, as a relay in-vehicle or roadside communication device to the communication destination roadside or in-vehicle communication device, an in-vehicle or roadside communication device, which is highly likely to be able to directly communicate with the communication destination in-vehicle or roadside communication device, from the other in-vehicle or roadside communication devices existing around the communication source in-vehicle or roadside communication device.

Further, in the case of the system in which road-to-vehicle communication and inter-vehicle communication are commonly used, it may also be configured, in view of the fact that the position information of the roadside communication device is not temporally changed, such that a roadside communication device is preferentially selected as a relay communication device by taking into consideration the moving direction and the moving speed of the communication source in-vehicle communication device, regardless of the sequence between the reception time at the reception of the position information from the roadside communication device and the reception time at the reception of the position information from the other in-vehicle communication device, that is, even when the position information reception time at the reception of the position information from the roadside communication device is before the position information reception time at the reception of the position information from the moving in-vehicle communication device.

Further, it may also be configured such that radio transmission and reception signals used for mutually exchanging position information between the surrounding in-vehicle communication devices, and radio transmission and reception signals used for transmitting information to a transmission destination which is designated to realize a required communication service by using the road-to-vehicle and inter-vehicle communication systems, are transmitted and received by using the same radio communication channel or transmitted and received by using different radio communication channels respectively for the two kinds of radio transmission and reception signals.

Further, as for the radio communication systems, such as Bluetooth (registered trademark) and a wireless LAN, such as DRSC (Dedicated Short Range Communication) and IEEE 802.11b/a/g, radio communication devices based on the same radio communication system may be commonly used for the two kinds of radio transmission and reception signals, or radio communication devices based on the different radio communication systems may also be used separately for the two kinds of radio transmission and reception signals.

(Description of Effect)

As described above, in each of the exemplary embodiments according to the present invention, by collecting position information (surrounding position information) periodically transmitted from in-vehicle communication devices mounted to the other vehicles existing in the direct possible range of communication of a communication source in-vehicle or roadside communication device, and from roadside communication devices installed at the side of a road, and the reception time (position information reception time) at the reception of the position information, the communication source in-vehicle or roadside communication device adaptively and efficiently manages the information about the communication devices capable of directly communicating with the communication source in-vehicle or roadside communication device. In the case where communication is to be performed to a vehicle existing at a position where radio waves of the communication source in-vehicle or roadside communication device do not reach, such as a case where communication is to be performed to a vehicle existing around an intersection located in the vehicle advancing direction, even when the positional relationship between the vehicles is frequently changed, a relay in-vehicle or roadside communication device can be properly selected by using the adaptively managed position information of the surrounding in-vehicle and roadside communication devices, the reception time at the reception of the position information, and the information about the geographical position or area where the communication destination exists. As a result, information can be stably transmitted to the designated communication destination in-vehicle or roadside communication device by efficiently using a radio band.

According to the exemplary embodiments configured as described above, the following effects can be obtained.

The communication source in-vehicle or roadside communication device can adaptively and efficiently manage the information about communication devices capable of directly communicating with the communication source in-vehicle or roadside communication device by collecting position information (surrounding position information), which is periodically transmitted from in-vehicle communication devices mounted to the other vehicles existing in the surrounding area in the possible range of direct communication of the communication source in-vehicle or roadside communication device, and which is periodically transmitted from roadside communication devices installed at the side of a road, and the reception time (position information reception time) at the reception of the position information.

In the case where communication is to be performed to a vehicle existing at a position where radio waves from the communication source in-vehicle or roadside communication device do not directly reach, such as a case where communication is to be performed to a vehicle existing around an intersection located in the vehicle advancing direction, even when the positional relationship between the vehicles is frequently changed, a relay in-vehicle or roadside communication device can be properly selected by using the adaptively managed position information of the surrounding in-vehicle and roadside communication devices, the reception time at the reception of the position information, and the information about the geographical position or area where the communication destination exists. Thereby, information can be stably transmitted to the designated communication destination in-vehicle or roadside communication device by efficiently using a radio band.

In the above, the present invention is explained with reference to the exemplary embodiments, but the present invention is not limited to the above described exemplary embodiments. Similarly to an example represented as the first exemplary embodiment, various modifications apparent to those skilled in the art can be made in the configuration and the details of the present invention without departing from the spirit and scope of the invention.

Description of Symbols

1 In-vehicle communication'device
2 In-vehicle communication device
3 In-vehicle communication device
4 In-vehicle communication device
5 In-vehicle communication device 6 In-vehicle communication device
N In-vehicle communication device
11 In-vehicle radio section
11a Radio reception signal
11b Radio transmission signal
12 In-vehicle communication control section
12a Surrounding vehicle position information
12b Position information reception time
12c Transmission destination position/area information
12d Transmission destination setting signal
12e Reception data
12f Transmission data
12g In-vehicle communication device input data
12h In-vehicle communication device output data
13 Transmission destination determining section
13a Latest position information
13b Latest position information reception time
13c Previous position information
13b Previous position information reception time
14 In-vehicle communication device external connection section
21 In-vehicle radio section
22 In-vehicle communication control section
23 Transmission destination determining section
24 In-vehicle communication device external connection section

The invention claimed is:

1. A communication device, which is mounted on a vehicle or installed at a roadside, and which performs inter-vehicle communication between in-vehicle communication devices mounted to vehicles, or which performs road-to-vehicle communication between an in-vehicle communication device and a road-side communication device installed at the roadside, comprising:
  an in-vehicle radio section which performs radio communication with the other communication device;
  a surrounding communication device information table which stores other communication device position information received from the other communication device and a time of the position information;
  a transmission destination determining section which controls a storage content of the surrounding communication device information table, and which, when receiving transmission destination position or area information representing a position or area of a transmission destination communication device, determines, on the basis of the transmission destination position or area information and of the storage content of the surrounding communication device information table, a communication device with which communication is to be performed, and then returns a determination result as a transmission destination setting signal; and
  an in-vehicle communication control section which transmits one's own device position information at every predetermined period from the in-vehicle radio section, which, when receiving the position information from the other communication device, stores the received position information in the surrounding communication device information table via the transmission destination determining section together with the reception time of the position information, and which when performing communication with a communication device whose position or area is designated, outputs the transmission destination position or area information to the transmission destination determining section, and performs, via the in-vehicle radio section, communication with the communication device designated by the subsequently transmitted transmission destination setting signal,
wherein the radio communication channel used in a radio signal for transmitting and receiving a data information is different from the radio communication channel for transmitting and receiving the device position information,
wherein when selecting a relay communication device from communication devices which are a latest to be set and registered in the surrounding communication device information table, the transmission destination determining section sets the communication device arranged at the roadside to have a higher priority for the relay communication device than the in-vehicle communication device.

2. The communication device according to claim 1,
wherein, when determining that the position or area represented by the received transmission destination position or area information is not within a possible range of direct communication, the transmission destination determining section selects the relay communication device on the basis of the position or area represented by the transmission destination position or area information, and on the basis of the position information from the other communication device and the time of the position information, which are most lately set and registered in the surrounding communication device information table, and returns a transmission destination setting signal in which the selected communication device is set as a relay transmission destination.

3. The communication device according to claim 2,
wherein when selecting the relay communication device, the transmission destination determining section selects a communication device which exists in a same direction as a direction of the position or area represented by the transmission destination position or area information, and whose position information is the latest to be received.

4. The communication device according to claim 2,
wherein when selecting the relay communication device, the transmission destination determining section calculates a moving direction and a moving speed of the communication device that is the latest to be set and registered in the surrounding communication device information table, and determines, by referring to the calculated moving direction and moving speed of the communication device, whether or not it is necessary to change a communication device to be selected as the relay communication device.

5. The communication device according to claim 2,
wherein when selecting the relay communication device from communication devices which are the latest to be set and registered in the surrounding communication device information table, the transmission destination determining section excludes, from a candidate relay communication device, a communication device which is located in a direction opposite to the direction of the position or area represented by the transmission destination position or area information, and excludes a communication device which corresponds to the position information reception time prior to a time going back by a predetermined time limit from a present time, or lowers a priority of the communication devices as the candidate relay communication device.

6. The communication device according to claim 1,
wherein the in-vehicle radio section performs, using a same radio communication channel, communication to transmit one's own device position information at every predetermined period and communication with the communication device designated by the transmission destination setting signal.

7. The communication device according to claim 1,
wherein the in-vehicle radio section respectively performs, using radio communication channels different from each other, communication to transmit one's own device position information at every predetermined period and communication with the communication device designated by the transmission destination setting signal.

8. The communication device according to claim 1,
wherein the in-vehicle radio section performs, using a same radio communication system, communication to transmit one's own device position information at every predetermined period and communication with the communication device designated by the transmission destination setting signal.

9. The communication device according to claim 1,
wherein the in-vehicle radio section respectively performs, using radio communication systems different from each other, communication to transmit one's own device position information at every predetermined period and communication with the communication device designated by the transmission destination setting signal.

10. An inter-vehicle communication system which performs communication by using the communication devices according to claim 1 which are mounted on vehicles different from each other.

11. The communication device according to claim 3,
wherein when selecting the relay communication device, the transmission destination determining section calculates a moving direction and a moving speed of the communication device that is the latest to be set and registered in the surrounding communication device information table, and determines, by referring to the calculated moving direction and moving speed of the communication device, whether or not it is necessary to change a communication device to be selected as the relay communication device.

12. The communication device according to claim 3,
wherein when selecting the relay communication device from communication devices which are the latest to be set and registered in the surrounding communication device information table, the transmission destination determining section excludes, from a candidate relay communication device, a communication device which is located in a direction opposite to the direction of the position or area represented by the transmission destination position or area information, and excludes a communication device which corresponds to the position information reception time prior to a time going back by a predetermined time limit from a present time, or lowers the priority of the communication devices as the candidate relay communication device.

13. The communication device according to claim 4,
wherein when selecting the relay communication device from communication devices which are the latest to be set and registered transmission destination in the surrounding communication device information table, the determining section excludes, from a candidate relay communication device, a communication device which is located in a direction opposite to the direction of the position or area represented by the transmission destination position or area information, and excludes a communication device which corresponds to the position information reception time prior to a time going back by a predetermined time limit from a present time, or lowers the priority of the communication devices as the candidate relay communication device.

14. The communication device according to claim 3,
wherein when selecting the relay communication device from communication devices which are the latest to be set and registered in the surrounding communication device information table, the transmission destination determining section sets the communication device arranged at the roadside to have a higher priority for the relay communication device than the in-vehicle communication device.

15. The communication device according to claim 2,
wherein the in-vehicle radio section performs, using a same radio communication channel, communication to transmit one's own device position information at every predetermined period and communication with the communication device designated by the transmission destination setting signal.

16. The communication device according to claim 2,
wherein the in-vehicle radio section respectively performs, using radio communication channels different from each other, communication to transmit one's own device position information at every predetermined period and communication with the communication device designated by the transmission destination setting signal.

17. The communication device according to claim 2,
wherein the in-vehicle radio section performs, using a same radio communication system, communication to transmit one's own device position information at every predetermined period and communication with the communication device designated by the transmission destination setting signal.

18. The communication device according to claim 2,
wherein the in-vehicle radio section respectively performs, using radio communication systems different from each other, communication to transmit one's own device position information at every predetermined period and communication with the communication device designated by the transmission destination setting signal.

19. A communication method, which is performed by a communication device mounted on a vehicle or by a communication device arranged at a roadside, and which performs inter-vehicle communication between in-vehicle communication devices mounted on vehicles or which performs road-to-vehicle communication between an in-vehicle communication device and a communication device arranged at the roadside, the method comprising the steps of:
storing the other communication device position information received from the other communication device and a time of the position information in a surrounding communication device information table;
when receiving transmission destination position or area information representing a position or area of a transmission destination communication device, a transmission destination determining section determining, on the basis of the transmission destination position or area information and a storage content of the surrounding communication device information table, a communication device with which communication is performed, and returning a determination result as a transmission destination setting signal; and transmitting, by an in-vehicle communication control section one's own device position information at every predetermined period, and storing, when receiving the position information from the other communication device, the received position information in the surrounding communication device information table via the transmission destination determining section together with the reception time of the position information, while when performing communication with a communication device whose position or area is designated, the in-vehicle communication control section outputs the transmission destination position or area information to the transmission destination determining section, and performs communication with the communication device designated by the subsequently transmitted transmission destination setting signal;

wherein the radio communication channel used in a radio signal for transmitting and receiving a data information is different from the radio communication channel for transmitting and receiving the device position information, when selecting a relay communication device from communication devices which are a latest to be set and registered in the surrounding communication device information table, the transmission destination determining section sets the communication device arranged at the roadside to have a higher priority for the relay communication device than the in-vehicle communication device.

* * * * *